United States Patent
Nakajima et al.

(10) Patent No.: US 12,426,609 B2
(45) Date of Patent: Sep. 30, 2025

(54) SOLID COMPOSITION CONTAINING LINALOOL, GERANIOL, AND DEXTRIN AND FOOD AND DRINKS CONTAINING SAME

(71) Applicant: SUNTORY HOLDINGS LIMITED, Osaka (JP)

(72) Inventors: Takeshi Nakajima, Kyoto (JP); Keita Kikuchi, Kyoto (JP); Daisaku Yonezawa, Kanagawa (JP); Yuji Hirayama, Kanagawa (JP); Taisuke Osanai, Kanagawa (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 366 days.

(21) Appl. No.: 17/764,637

(22) PCT Filed: Sep. 25, 2020

(86) PCT No.: PCT/JP2020/036278
§ 371 (c)(1),
(2) Date: Mar. 29, 2022

(87) PCT Pub. No.: WO2021/065718
PCT Pub. Date: Apr. 8, 2021

(65) Prior Publication Data
US 2022/0346401 A1  Nov. 3, 2022

(30) Foreign Application Priority Data
Sep. 30, 2019 (JP) .............................. JP2019-180914

(51) Int. Cl.
*A23F 3/30* (2006.01)
(52) U.S. Cl.
CPC ....................... *A23F 3/30* (2013.01)
(58) Field of Classification Search
CPC ............................................. A23F 3/30
See application file for complete search history.

(56) References Cited

U.S. PATENT DOCUMENTS

| 3,966,986 | A | 6/1976 | Hunter et al. | |
| 11,849,736 | B2 * | 12/2023 | Yonezawa | A23F 3/18 |
| 2022/0211067 | A1 * | 7/2022 | Yonezawa | A23F 3/30 |
| 2022/0330579 | A1 * | 10/2022 | Nakajima | A23L 27/20 |
| 2022/0408772 | A1 * | 12/2022 | Nakajima | A23L 2/39 |
| 2024/0032558 | A1 * | 2/2024 | Osanai | A23F 3/14 |

FOREIGN PATENT DOCUMENTS

| JP | H01-181781 A | 7/1989 |
| JP | 3-35898 B2 | 5/1991 |
| JP | 3-36491 B2 | 5/1991 |
| JP | 5-304890 A | 11/1993 |
| JP | 2005-143467 A | 6/2005 |
| JP | 2009-17867 A | 1/2009 |
| JP | 2012-115247 A | 6/2012 |
| JP | 2015-119657 A | 7/2015 |
| JP | 2019-180298 A | 10/2019 |
| WO | 2011/126005 A1 | 10/2011 |
| WO | 2015/167221 A1 | 11/2015 |
| WO | 2018/066613 A1 | 4/2018 |

OTHER PUBLICATIONS

Tan, H.R. et al., "Characterisation of key odourants in Japanese green tea using gas chromatography-olfactometry and gas chromatography-mass spectrometry", LWT—Food Science and Technology, 2019, vol. 108, pp. 221-232, cited in CN Office Action dated Nov. 22, 2023. (12 pages).
Jeon et al., "Determination of volatile organic compounds, catechins, caffeine and theanine in Jukro tea at three growth stages by chromatographic and spectrometric methods", Food Chemistry, 2017, vol. 219, pp. 443-452 in particular, table 1, cited in ISR (10 pages).
Owuor et al., "Effects of Fermentation under Enriched Oxygen Atmosphere on Clonal Black Tea Aroma Complex", Food Sci. Techno. Int. Tokyo, 1998, vol. 4, No. 2, pp. 136-139 in particular, table 1, cited in ISR (4 pages).
Owuor et al., "Effects of storage time in a two-stage withering process on the quality of seedling black tea", Food Chemistry, 1992, vol. 45, pp. 45-49 in particular, table 2, cited in ISR (5 pages).
International Search Report dated Nov. 17, 2020, issued in counterpart International Application No. PCT/JP2020/036278 (3 pages).
Extended (Supplementary) European Search Report dated Aug. 30, 2023, issued in counterpart EP Application No. 20870984.0. (9 pages).

* cited by examiner

*Primary Examiner* — Erik Kashnikow
(74) *Attorney, Agent, or Firm* — WHDA, LLP

(57) ABSTRACT

An object is to provide a solid composition which is excellent in capability of retaining linalool and geraniol. A solid composition containing linalool d geraniol has dextrin having a molecular weight of 50,000 or more incorporated therein.

18 Claims, No Drawings

SOLID COMPOSITION CONTAINING LINALOOL, GERANIOL, AND DEXTRIN AND FOOD AND DRINKS CONTAINING SAME

TECHNICAL FIELD

The present invention relates to a solid composition containing linalool, geraniol and dextrin.

BACKGROUND ART

As a typical powdering method for obtaining instant tea, a spray drying method suitable for continuous mass production has been adopted. Spray drying is a method in which fine droplets are ejected into hot air to instantaneously evaporate water, and is a technique in which the residence time exposed to high temperature is short, and the heat quantity given is consumed as latent heat of evaporation, so that the thermal load on the content liquid is suppressed and powder with little deterioration in quality can be obtained. The higher the concentration of the content liquid subjected to spray drying, the higher the retention rate of the aroma component contained in the liquid after spray drying. This can be explained by the selective diffusion theory; in the droplets during drying, when the solute concentration is low, the diffusion coefficient of the aroma component is low, and the aroma component volatilizes simultaneously with the evaporation of water. However, the higher the solute concentration, the higher the diffusion coefficient of the aroma component, and the scent remains due to water evaporating earlier than the migration of the aroma component. Therefore, in order to attain instant tea of high quality, it is important to produce a tea concentrate containing a high concentration of the aroma component.

Methods for concentrating a tea extract, from the viewpoint of the principle of whether water is separated in a solid, liquid, or gas phase, can be classified into three types: freeze concentration (aqueous phase-solid); membrane concentration (aqueous phase-liquid); and evaporation concentration (aqueous phase gas). Among them, in the evaporation concentration, a thermal load applied to a content liquid is large, and thus, it is difficult to obtain a concentrate retaining the aroma component, which is prone to thermal degradation like tea. Furthermore, as for the freeze concentration, in addition to the fact that the concentration tune and cost are large, which is a high hurdle for its practical use, it is difficult to increase the concentration in the first place. For this reason, concentration by any of these schemes has not been often adopted. On the other hand, the membrane concentration is a scheme in which the solute concentration is increased by applying pressure to water as it is through a membrane with fine pores, eliminating evaporation and/or freezing, and thus allowing concentration at low cost without quality change.

Furthermore, as a means for producing a tea concentrate, it is known to add dextrin, which is a kind of excipient and has a molecular structure with sugars linked in a chain, to a tea extract. For example, it has been reported that when acyclic dextrin or cyclic dextrin having an average degree of polymerization of 4 to 10 is added to an extract of tea leaves, roasted grains, or roasted beans before concentration and then subjected to membrane concentration at 40° C., the extract can be concentrated without reducing the concentration efficiency (PTL 1).

Furthermore, it is known that a specific dextrin improves the solubility of instant tea after spray drying. For example, it has been reported that instant tea having excellent flavor and immediate solubility can be produced by spray drying of tea which contains dextrin having an average degree of polymerization of 4 to 10 alone or in combination with cyclic dextrin and which has carbon dioxide dissolved therein (PTL 2). Furthermore, it has been reported that by spray drying of a tea extract with indigestible dextrin added thereto, instant tea excellent in flavor and solubility can be provided (PTL 3).

CITATION LIST

Patent Literature

[PTL 1] JP H3-36491 B2
[PTL 2] JP H3-35898 B2
[PTL 3] JP 2009-17867 A

SUMMARY OF INVENTION

Technical Problem

As a characteristic aroma of so-called high-grade green tea among the tea beverages, there is a so-called floral scent, and it is known that linalool and geraniol have the greatest effect on the flower-like scent in tea. However, since linalool and geraniol are prone to volatilizing, in the production of a solid composition containing linalool and geraniol, the two components have not always been sufficiently retained at a high concentration in the solid composition. Accordingly, an object of the present invention is to provide a solid composition which is excellent in capability of retaining linalool and geraniol and which has a floral scent strongly felt when made into a beverage using water, hot water, or the like.

Solution to Problem

As a result of intensive studies to solve the above problem, the present inventors focused on dextrin in the production of a solid composition containing linalool and geraniol, and have found that by incorporating a polymer dextrin into the solid composition, linalool and geraniol can be retained at a high concentration in the solid composition. Based on this finding, the present inventors have completed the present invention.

The present invention relates to, but is not limited to, the following:

(1) A solid composition containing linalool, geraniol, and dextrin,
wherein a content of linalool in the composition is 0.62 µg or more per gram of the composition (0.62 µg/g), and the composition contains dextrin having a molecular weight of 50,000 or more.
(2) The composition according to (1), wherein a content of geraniol in the composition is 1.87 µg or more per gram of the composition (1.87 µg/g).
(3) The composition according to (1) or (2), wherein a proportion of the dextrin having a molecular weight of 50,000 or more in molecular weight distribution of the composition is 5 to 35%.
(4) The composition according to any one of (1) to (3), wherein a proportion of dextrin having a molecular weight of from 50,000 to 200,000 in molecular weight distribution of the composition is 2 to 30%.
(5) The composition according to any one of (1 to (4), wherein a proportion of dextrin having a molecular weight of from 200,000 to 350,000 in molecular weight distribution of the composition is 0.5 to 6%.

(6) The composition according to any one of (1) to (5), wherein a proportion of dextrin having a molecular weight of 250,000 or more in molecular weight distribution of the composition is 0.5 to 8%.

(7) The composition according to any one of (1) to (6), wherein a proportion of dextrin having a molecular weight of 350,000 or more in molecular weight distribution of the composition is 0.15 to 3%.

(8) The composition according, to any one of (1) to (7), wherein the composition contains two or more kinds of dextrin.

(9) The composition according to any one of (1) to (8), wherein the composition contains linear dextrin and cyclic dextrin.

(10) The composition according to any one of (1) to (9), further containing one or more aroma components selected from the group consisting of 2-methylbutanal, α-ionone, β-cyclocitral, (z)-3-hexenol, 1-penten-3-ol, nerolidol, hexanal, oxide, β-myrcene, trans-β-ocimene, L-α-terpineol, methyl salicylate, benzyl alcohol and indole.

(11) The composition according to any one of (1) to (10), wherein the composition is a powder composition.

(12) The composition according to any one of (1) to (11), wherein the composition contains a tea leaf extract.

(13) The composition according to (12), wherein the tea leaf extract is a tea leaf extract of sencha.

(14) A food or drink containing the composition according to any one of (1) to (13).

(15) The food or drink according to claim (14), wherein the food or drink is a beverage.

(16) The food or drink according to claim (15), wherein the food or drink is a tea beverage.

(17) A food or drink containing linalool, geraniol, and dextrin, wherein a content of linalool in the food or drink is 6.0 ppb (v/v) or more per 1.0% solid content (Brix), and the food or drink contains, dextrin having a molecular weight of 50,000 or more.

(18) The food or drink according to (17), wherein a content of geraniol in the food or drink is 18.0 ppb (v/v) or more per 1.0% solid content (Brix).

Advantageous Effects of Invention

According to the present invention, it is possible to provide a solid composition capable of retaining linalool and geraniol at a high concentration. In the present invention, linalool and geraniol contained in a solution before drying in a production process can be retained at a high concentration in a solid composition from the drying. For this reason, through the use of the present invention, a solid composition abundantly containing linalool and geraniol can be provided.

The solid composition of the present invention can be made into a tea beverage using water or hot water, and can provide a strong floral scent when drinking. Furthermore, the solid composition of the present invention is much lighter than a beverage, and thus is excellent in convenience during transportation.

Furthermore, the solid composition of the present invention can also be used as a raw material for food. The number and types of foods having tea flavor have been increasing in recent years. The solid composition of the present invention can be used to impart a floral scent to confectioneries such as cakes, castella, candies, cookies, jellies puddings, and chocolates.

DESCRIPTION OF EMBODIMENTS

1. Solid Composition

One embodiment of the present invention is a solid composition containing linalool, geraniol, and dextrin, a content of linalool in the composition being 0.62 µg or more per gram of the composition (0.62 µg/g or more), and the composition containing dextrin having a molecular weight of 50,000 or more. By adopting such a configuration, the content of linalool and/or geraniol in the solid composition can be maintained at a high level, and it is possible to provide a solid composition that has a floral scent strongly felt when made into a beverage using water, hot water, or the like. Here, the term "floral scent" as used herein refers to a scent having a lily-of-the-valley-like refreshing scent added with a rose-like sweet smell.

1-1. Linalool and Geraniol

The solid composition of the present invention contains linalool and geraniol. Linalool is a monoterpene alcohol represented by the molecular formula of $C_{10}H_{18}O$, and is known to have a scent like lily-of-the-valley, lavender, or bergamot. Geraniol is a linear monoterpenoid represented by the chemical formula of $C_{10}H_{17}OH$, and is blown to be contained in essential oils such as rose oil, palmarosa oil, and citronella oil and to have a rose-like scent.

A content of linalool in the solid composition of the present invention is not particularly limited and is, for example, 0.62 µg or snore per gain of the solid composition (0.62 µg/g or more), preferably 0.625 µg/g or more, more preferably 0.630 µg/g or more, even more preferably 0.635 µg/g or more, and particularly preferably 0.640 µg/g, or more. When the content of linalool is within the above range, a floral scent will be exhibited. The content of linalool in the solid composition of the present invention does not have a particular upper limit, and is, for example, 50,000 µg or less per gam of the solid composition (50,000 µg/g or less), preferably 40,000 µg/g or less, more preferably 30,000 µg/g or less, even more preferably 20,000 µg/g or less, and particularly preferably 10,000 µg/g or less. The content of linalool in the solid composition of the present invention is typically 0.62 to 50,000 µg per gram of the solid composition 0.62 to 50,000 µg/g), preferably 0.625 to 40,000 µg/g, more preferably 0.6.30 to 30,000 µg/g even more preferably 0.635 to 20,000 µg/g and particularly preferably 0.640 to 10,000 µg/g.

A content of geraniol in the solid composition of the present invention is not particularly limited, and is, for example, 1.87 µg or more per gram of the solid composition (1.87 µg/g or more), preferably 1.9 µg/g or more, more preferably 1.92 µg/g or more, even more preferably 1.94 µg/g or more, and particularly preferably 1.98 µg/g or more. When the content of geraniol is within the above range, a floral scent will be more strongly exhibited. The content of geraniol in the solid composition of the present invention does not have a particular upper limit, and is, for example, 100,000 µg or less per gram of the solid composition (100,000 µg/g or less), preferably 50,000 mg/g or less, more preferably 20,000 µg/g or less, even more preferably 10,000 µg/g or less, and particularly preferably 5,000 µg/g or less. The content of geraniol in the solid composition of the present invention is typically 1.87 to 100,000 µg per gram of the solid composition (1.87 to 100,000 µg/g), preferably 1.9 to 50,000 more preferably 1.92 to 20,000 µg/g, even more preferably 1.94 to 10,000 µg/g, and particularly preferably 1.96 to 5,000 µg/g.

Furthermore, in the present invention, the content of linalool and geraniol in the solid composition can be measured using gas chromatography (GC). Furthermore, examples of an analyzer therefor include Flash GC Nose HERACLES II (Alpha M.O.S. Japan K.K.). Specifically, a solution is prepared by dissolving the solid composition of the present invention in water, and the contents of various aroma components can be measured using the solution under the following conditions.

Gas chromatography apparatus: Flash GC Nose HERACLES II
Column 1: MXT-5 (low polarity 10 m, 180 µm ID, 0.4 µm)
Column 2: MXT-WAX (high polarity 10 m, 180 µm ID, 0.4 µm)
Carrier-gas flow rate: hydrogen 1.6 mL/min
Flame ionization detector (FID) temperature: 260° C.
Injector temperature: 200° C.
Oven temperature: 40° C. (5 seconds) to 1.5° C./second to 250° C. (90 seconds)
Injection time: 125 seconds
Trapping temperature: adsorption 50° C. desorption 240° C.
Trapping time: adsorption 130 seconds preheating 35 seconds Conditions relating to measurement samples can be set as described in examples below. After the contents of linalool and geraniol in the solution are measured, the contents of linalool and geraniol in the solid composition can be obtained by back calculation from the amount of the solid composition dissolved in water.

In the present invention, when an aroma component such as linalool or geraniol is a glycoside, the amount of the aroma component, unless otherwise specified, indicates an amount corresponding to the aroma component itself excluding a sugar moiety, such as linalool itself and/or geraniol itself. Removal of the glycosides (sugar moiety) can be carried out by using an appropriate glucosidase.

In the solid composition of the present invention, linalool and/or geraniol may be used in a purified or crude form, or an extract containing linalool and/or geraniol may be used. For the extract containing linalool and/or geraniol, a naturally-derived extract can be used, and both a plant extract and an animal extract can be used. In the present invention, it is preferable to use a plant extract; and among plants, a tea leaf extract is more preferably used. Here, although not particularly limited, the tea leaf extract containing linalool and/or geraniol is preferably a tea leaf extract of a type different from the tea leaf extract described below. That is, when the tea leaf extract described in the section "1-4. Tea Leaf Extract" described below is used as a first tea leaf extract, the tea leaf extract containing linalool and/or geraniol can be used as a second tea leaf extract different from the first tea leaf extract.

For raw material tea leaves for the tea leaf extract containing linalool and/or geraniol, non-fermented tea is preferably used, and specific examples thereof include green teas such as aracha, sencha, gyokuro, kabusecha, tencha, bancha, and houjicha. The tea leaf extract containing linalool and/or geraniol may be extracted from only one kind of tea leaves or may be extracted from a blend of a plurality of kinds of tea leaves. In the present invention the tea leaf extract containing linalool and/or geraniol is preferably a tea leaf extract of green tea, more preferably an extract of tea leaves that have been covered and cultivated with sunlight shielded before plucking, such as kabusecha, gyokuro, or tencha. By using the extract of tea leaves that have been covered and cultivated with sunlight shielded before plucking them, such as kabusecha, gyokuro, or tencha, aroma components other than linalool and/or geraniol derived from these tea leaves can be contained, which can impart, to the solid composition, a flavor that is superior as befits high-class tea.

When the tea leaf extract containing linalool and/or geraniol is used, the content thereof is not particularly limited, and can be adjusted such that the content of linalool and/or geraniol in the solid composition of the present invention will fall within the range indicated above.

1-2. Dextrin

The solid composition of the present invention contains dextrin. Dextrin is a generic name for carbohydrates obtained by hydrolysis of starch or glycogen. In the present invention, the dextrin can be used as an excipient for forming the solid composition, and molecular weight distribution in the solid composition of the present invention can be adjusted according to the weight average molecular weight of the dextrin used and the content thereof in the composition.

A content of the dextrin in the solid composition of the present invention is not particularly limited, and is, for example, 10 to 70 wt %, preferably 20 to 65 wt %, and more preferably 30 to 60 wt %. For the dextrin in the present invention, commercially available products can be used. The content of the dextrin in the solid composition can be measured by performing sugar analysis using a method known to those skilled in the art.

A high-molecular-weight dextrin as used herein refers to dextrin having a molecular weight of 10,000 or more, and a low-molecular-weight dextrin refers to dextrin having a molecular weight of less than 10,000.

The solid composition of the present invention contains dextrin having a molecular weight of 50,000 or more. The presence of such dextrin as having a high molecular weight makes it possible to retain linalool and geraniol at a high concentration in the solid composition.

On the other hand, when the amount of the dextrin having the high molecular weight is too large, for example, when a proportion of dextrin having a molecular weight of 50,000 or more exceeds 45%, the viscosity of the composition before solidification will be too high to perform a drying treatment, and it tends to be difficult to obtain the solid composition. In the molecular weight distribution of the solid composition of the present invention, the proportion of the dextrin having a molecular weight of 50,000 or more is preferably 5 to 35%, more preferably 5.5 to 30%, even more preferably 6.0 to 28%, and particularly preferably 6.5 to 25%.

In the present invention, the distribution of molecular weights in the solid composition can be determined by using a gel permeation chromatography (GPC) analysis method. Specifically, the distribution of molecular weights in the solid composition can be examined under the following conditions.

Apparatus: Sampling Injector: 231 XL (GILSON)
Pump: 305 (GILSON)
Column oven: CTO 10AS VP (Shimadzu Corporation)
Detector: RID-10A (Shimadzu Corporation)
Columns: connected in series in the following order
[Pump]→TSKgel Guard Column PWxl (6.0 mm I.D.×4 cm) (TOSOH CORPORATION)→TSKgel G4000PWxl (particle size 10 µm 7.8 mm I.D.×30 cm) (TOSOH CORPORATION)→TSKgel G3000PWxl (particle size 7 µm, 7.8 mm I.D.×30 cm) (TOSOH CORPORATION)→[Detector]
Analytical Data System: LabSolutions (Shimadzu Corporation)
Flow rate: 1 mL/min
Injection volume: 50 µL
Mobile phases: 0.1 mol/L sodium nitrate solution
Column temperature: 50° C.

An analytical sample can be prepared as described in the examples below. Proportions of components having various molecular weights in molecular weight distribution can also be determined as described in the examples below and can be determined specifically by calculating the proportion of a target peak area to a total value of obtained peak areas (total peak area).

In the molecular weight distribution of the solid composition of the present invention, a proportion of dextrin having a molecular weight of 100,000 or more is not particularly limited, and is, for example, 2.0 to 28%, preferably 3.0 to 25%, and more preferably 4.0 to 20%. Furthermore, in the molecular weight distribution of the solid composition of the present invention, the proportion of dextrin having a molecular weight of 150,000 or more is not particularly limited, and is, for example, 1.0 to 20%, preferably 2.0 to 1.5%, and more preferably 2.5 to 12%. Furthermore, in the molecular weight distribution the solid composition of the present invention, the proportion of dextrin having a molecular weight of 200,000 or more is not particularly limited, and is, for example, 0.5 to 12%, preferably 1.0 to 10%, and more preferably 1.5 to 7.0%. Furthermore, in the molecular weight distribution of the solid composition of the present invention, the proportion of dextrin having a molecular weight of 250,000 or more is not particularly limited, is, for example, 0.5 to 8%, preferably 0.60 to 6.0%, and more preferably 0.80 to 4.0%. Furthermore, in the molecular weight distribution of the solid composition of the present invention, the proportion of dextrin Laying a molecular weight of 300,000 or more is not particularly limited, and is, for example, 0.20 to 8.0%, preferably 0.30 to 5.0%, and more preferably 0.40 to 2.5%. Furthermore, in the molecular weight distribution of the solid composition of the present invention, the proportion of dextrin having a molecular weight of 350,000 or more is not particularly limited, and is, for example, 0.15 to 3%, preferably 0.20 to 2.5%, and more preferably 0.250 to 1.5%. Furthermore, in the molecular weight distribution of the solid composition of the present invention, the proportion of dextrin having a molecular weight of 400,000 or more is not particularly limited, and is, for example, 0.080 to 3.0%, preferably 0.10 to 2.0%, and more preferably 0.12 to 1.0%. Furthermore, in the molecular weight distribution of the solid composition of the present invention, the proportion of dextrin having a molecular weight of 450,000 or more is not particularly limited, and is, for example, 0.040 to 1.5%, preferably 0.050 to 1.0%, and more preferably 0.060 to 0.70%. Furthermore, in the molecular weight distribution of the solid composition of the present invention, the proportion of dextrin having a molecular weight of 500,000 or more is not particularly limited, and is, for example, 0.020 to 1.2%, preferably 0.030 to 0.80%, and more preferably 0.040 to 0.50%.

Furthermore, in the molecular weight distribution of the solid composition of the present in the proportion of dextrin having a molecular weight of 50,000 or more and less than 200,000 is not particularly limited, and is, for example, 2 to 30%, preferably 4.0 to 25%, and more preferably 5.0 to 20%. Furthermore, in the molecular weight distribution of the solid composition of the present invention, the proportion of dextrin having a molecular weight of 200,000 or more and less than 350,000 is not particularly limited, and is, for example, 0.5 to 6%, preferably 0.70 to 5.5%, and more preferably 1.0 to 5.0%.

In the molecular weight distribution of the solid composition of the present invention, a proportion of a component having a molecular weight of less than 50,000 is not particularly limited. In the molecular weight distribution of the solid composition of the present invention, a proportion of a component having a molecular weight of less than 3,000 is, for example, 35% or more, preferably 40% or more, and more preferably 45% or more. Furthermore, in the molecular weight distribution of the solid composition of the present invention, a proportion of a component having a molecular weight of 3,000 or more and less than 10,000 is, for example, 5.0% or more, preferably 7.0% or more, and more preferably 9.0% or more. Furthermore, in the molecular weight distribution of the solid composition of the present invention, a proportion of a component having a molecular weight of 10,000 or more and less than 50,000 is, for example, 2.0 to 40%, preferably 4.0 to 35%, and more preferably 6.0 to 30%.

A further constituent proportion of dextrin having a molecular weight of 50,000 or more in the solid composition of the present invention is not particularly limited; and in a molecular weight range of 50,000 or more and less than 500,000, it is preferable that the proportion decreases as the molecular weight increases. That is, preferably, the proportion of dextrin having a molecular weight of 100,000 or more and less: than 150.000 is smaller than the proportion of dextrin having a molecular weight of 50,000 or more and less than 100,000, the proportion of dextrin having a molecular weight of 150,000 or more and less than 200,000 is smaller than the proportion of dextrin having a molecular weight of 100,000 or more and less than 150,000, the proportion of dextrin having a molecular weight of 200,000 or more and less than 250,000 is smaller than the proportion of dextrin having a molecular weight of 150,000 or more and less than 200,000, the proportion of dextrin having a molecular weight of 250,000 or more and less than 300000 is smaller than the proportion of dextrin having a molecular weight of 200,000 or more and less than 250,000 the proportion of dextrin having a molecular weight of 300,000 or more and less than 350,000 is smaller than the proportion of dextrin having a molecular weight of 250,000 or more and less than 300,000, the proportion of dextrin Laving a molecular weight of 350,000 or more and less than 400,000 is smaller than the proportion of dextrin having a molecular weight of 300,000 or more and less than 350,000, the proportion of dextrin having a molecular weight of 400,000 or more and less than 450,000 is smaller than the proportion of dextrin having a molecular weight of 350,000 or more and less than 400,000, the proportion of dextrin having a molecular weight of 450,000 or more and less than 500,000 is smaller than the proportion of dextrin having a molecular weight of 400.000 or more and less than 450,000.

As described above, in the present invention, the molecular weight distribution in the solid composition can be adjusted according to the type of dextrin used, and the like. The dextrin used in the present invention is not particularly limited, and for example, linear dextrin or cyclic dextrin can be used. The term "linear dextrin" as used herein refers to a dextrin in which glucose molecules are bonded linearly or are bonded in a chain as having a branched chain and do not form a cyclic structure or a helical structure. Furthermore, as used herein, the terra "cyclic dextrin" refers to a dextrin in which glucose molecules are bonded to form a ring structure and do not form a helical structure.

The chain dextrin is not particularly limited, and for example, linear dextrin having a dextrose equivalent (DE) of 1 to 25, linear dextrin having a weight average molecular weight of 500 to 160,000, or the like can be used. Furthermore, in the present invention, not only one kind of linear dextrin but also two or more kinds of linear dextrin may be used in combination. A preferred embodiment in the present invention is the use of two kinds of linear dextrin. When two kinds of linear dextrin are used, for example, a combination of a linear dextrin having a DE of 2 to 5 and a linear dextrin having a DE of 16 to 20 or a combination of a linear dextrin having a weight average molecular weight of 90,000 to 140,000 and a linear dextrin having a weight average molecular weight of 600 to 1,200 can be used.

When linear dextrin is used, the content of the linear dextrin in the solid composition of the present invention is, for example, 0 to 65 wt %, preferably 10 to 60 wt %, and more preferably 15 to 55 wt %. When the linear dextrin having a DE of 2 to 5 and the linear dextrin having a DE of 16 to 20 are used as the two types of linear dextrin, a content of the linear dextrin having a DE of 2 to 5 in the solid composition of the present invention is, for example, 0 to 60 wt %, preferably 5 to 50 wt %, and more preferably 10 to 45 wt %, and a content of the linear dextrin having a DE of 16 to 20 is, for example, 0 to 60 wt %, preferably 5 to 50 wt %, and more preferably 10 to 45 wt a. Furthermore, a content ratio (weight ratio) of the linear dextrin having a DE of 2 to 5 to the linear dextrin having a DE of 16 to 20 is, for example, 4:0.5 to 0.5:5, preferably 3:1 to 1:5, and more preferably 2:1 to 1:4.

Furthermore when the linear dextrin having a weight average molecular weight of 90,000 to 140,000 and the linear dextrin having a weight average molecular weight of 600 to 1,200 are used as the two types of linear dextrin, a content of the linear dextrin having a weight average molecular weight of 90,000 to 140,000 in the solid composition of the present invention is, for example, 0 to 65 wt %, preferably 10 to 60 wt %, more preferably 15 to 55 wt %, and a content of the linear dextrin having a weight average molecular weight of 600 to 1,200 is, for example, 5 to 60 wt %, preferably 5 to 50 wt %, more preferably 10 to 45 wt %. Furthermore, a content ratio (weight ratio) of the linear dextrin having a weight average molecular weight of 90,000 to 140,000 to the linear dextrin having a weight average molecular weight of 600 to 1,200 is, for example, 5:1 to 1:3, preferably 3:1 to 1:2, and more preferably 2:1 to 1:1.

As the cyclic dextrin, for example, cyclodextrin can be used. In the present invention, any of α-cyclodextrin, β-cyclodextrin, and γ-cyclodextrin can be used, and α-cyclodextrin is preferably used. A weight average molecular weight of the cyclic dextrin used in the present invention is not particularly limited, and is, for example, 700 to 1300, preferably 800 to 1,200, and more preferably 990 to 1,100. When the cyclic dextrin is used, a content of the cyclic dextrin in the solid composition of the present invention is, for example, 0.5 to 15 wt %, preferably 1 to 12 wt %, and more preferably 3 to 10 wt %.

When the linear dextrin and the cyclic dextrin are used, a content ratio (Weight ratio) of the linear dextrin to the cyclic dextrin is, for example, 20:1 to 2:1, preferably 15:1 to 3:1, and more preferably 12:1 to 5:1.

1-3. Other Aroma Components

In addition to linalool and geraniol described above, the solid composition of the present invention may further contain one or more aroma components selected from the group consisting of 2-methylbutanal, α-ionone, β-cyclocitral, (z)-3-hexenol, 1-penten-3-ol, nerolidol, hexanal, (E)-linalool oxide, β-myrcene trans-β-ocimene, L-α-terpineol, methyl salicylate, benzyl alcohol and indole. The solid composition of the present invention containing these aroma components will exhibit a more well-balanced floral scent.

A content of 2-methylbutanal in the solid composition of the present invention is not particularly limited, and is, for example, 0.1 to 10,000 μg per gram of the solid composition (0.1 to 10,000 μg/g), preferably 0.1 to 5,000 μg/g, more preferably 0.2 to 2,000 even more preferably 0.5 to 1,000 μg/g, and particularly preferably 1.0 to 500 μg/g.

A content of α-ionone in the solid composition of the present invention is not particularly limited, and is, for example, 0.1 to 10,000 μg per gram of the solid composition (0.1 to 10,000 μg/g), preferably 0.1 to 5,000 μg/g, more preferably 0.2 to 2,000 even more preferably 0.5 to 1,000 μg/g, and particularly preferably 1 to 500 μg/g.

A content of the β-cyclocitral in the solid composition of the present invention is not particularly limited, and is, for example, 0.1 to 10,000 μg per gram of the solid composition (0.1 to 10,000 μg/g), preferably 0.1 to 5,000 μg/g, more preferably 0.2 to 2,000 even more preferably 0.5 to 1,000 μg/g, and particularly preferably 1 to 500 μg/g.

A content of (z)-3-hexenol in the solid composition of the present invention is not particularly limited, and is, for example, 0.1 to 2,000 μg per gram of the solid composition (0.1 to 2,000 μg/g), preferably 0.5 to 1,000 μg/g, more preferably 1.0 to 500 μg/g, even more preferably 5.0 to 200 μg/g, and particularly preferably 10 to 100 μg/g.

A content of 1-penten-3-ol in the solid composition of the present invention is not particularly limited, and is, for example, 0.1 to 2,000 μg per gram of the solid composition (0.1 to 2,000 μg/g), preferably 0.5 to 1,000 μg/g, more preferably 1.0 to 500 μg/g, even more preferably 5.0 to 200 μg/g, and particularly preferably 10 to 100 μg/g.

A content of nerolidol in the solid composition of the present invention is not particularly limited, and is, for example, 0.01 to 1,000 μg per gram of the solid composition (0.01 to 1,000 μg/g), preferably 0.05 to 500 μg/g, more preferably 0.1 to 200 μg/g, even more preferably 0.5 to 100 μg/g, and particularly preferably 0.5 to 50 μg/g.

A content of hexanal in the solid composition of the present invention is not particularly limited, and is, for example, 0.01 to 1,000 μg/g per gram of the solid composition (0.01 to 1,000 μg/g), preferably 0.05 to 500 μg/g, more preferably 0.1 to 200 μg/g, even more preferably 0.5 to 100 μg/g, and particularly preferably 1.0 to 50 μg/g.

A content of (E)-linalool oxide in the solid composition of the present invention is not particularly limited, and is, for example, 1.0 to 10,000 μg per gram of the solid composition (1.0 to 10,000 μg/g), preferably 2.0 to 5,000 μg/g, more preferably 5.0 to 2,000 μg/g, even more preferably 10 to 1,000 μg/g, and particularly preferably 50 to 500 μg/g.

A content of β-myrcene in the solid composition of the present invention is not particularly limited, and is, for example, 0.1 to 10.000 μg per gram of the solid composition (0.1 to 10,000 μg/g), preferably 0.1 to 5,000 μg/g, more preferably 0.2 to 2,000 μg/g, even more preferably 0.5 to 1,000 μg/g, anal particularly preferably 1.0 to 500 μg/g.

A content of trans-β-ocimene in the solid composition of the present invention is not particularly limited, and is, for example, 0.1 to 10.000 μg per gram of the solid composition (0.1 to 10,000 μg/g), preferably 0.1 to 5,000 μg/g, more preferably 0.2 to 2,000 μg/g, even more preferably 0.5 to 1,000 μg/g, and particularly preferably 1.0 to 500 μg/g.

A content of L-α-terpineol in the solid composition of the present invention is not particularly limited, and is, for example, 0.1 to 10,000 µg per gram of the solid composition (0.1 to 10,000 µg/g), preferably 0.1 to 5,000 µg/g, more preferably 0.2 to 2,000 µg/g, even more preferably 0.5 to 1,000 µg/g, and particularly preferably 1.0 to 500 µg/g.

A content of methyl salicylate in the solid composition of the present invention is not particularly limited, and is, for example, 0.1 to 10,000 µg per gram of the solid composition (0.1 to 10,000 µg/g), preferably 0.1 to 5,000 µg/g, more preferably 0.2 to 2,000 µg/g, even more preferably 0.5 to 1,000 and particularly preferably 1.0 to 500 µg/g.

A content of benzylalcohol in the solid composition of the present invention is not particularly limited, and is, for example, 0.1 to 10,000 µg per gram of the solid composition (0.1 to 10,000 µg/g), preferably 0.1 to 5,000 µg/g, more preferably 0.2 to 2,000 µg/g, even more preferably 0.5 to 1,000 µg/g, and particularly preferably 1.0 to 500 µg/g.

In the present invention, the content of 2-methylbutanal in the solid composition can be measured using gas chromatography (GC) in the same manner as in the measurement of the content of linalool or geraniol described above. Specifically, a solution is prepared by dissolving the solid composition of the present invention in water, and the content of 2-methylbutanal can be measured using the solution under the same conditions as in the measurement of the content of linalool or geraniol described above.

In the present invention, the contents of α-ionone, β-cyclocitral, (z)-3-hexenol, 1-penten-3-ol, nerolidol, hexanal, (E)-linalool oxide, β-myrcene, trans-β-ocimene, L-α-terpineol, methyl salicylate, benzyl alcohol, and indole in the solid composition can be measured using gas chromatography mass spectrometry (GC/MS). Specifically, the contents of the above aroma components can be measured under the following conditions.

Apparatus: GC: Agilent Technologies GC7890B
MS: Agilent Technologies 5977A
HS: Gestel MPS
Tube: Tenax TA. Carbon bx1000
Column: HP-INNOWAX 60 m×0.25 mm i.d. df=0.25 µm
Temperature condition: 40° C. (4 minutes) to 5° C./minute to 2.60° C.
Carrier gas flow rate: He 1.5 ml/min
Injecting manner: splitless
Ion source temperature: 760° C.

Conditions relating to measurement samples can be set as described in examples below.

Since the solid composition of the present invention contains a tea leaf extract, the solid composition of the present invention may contain an aroma component derived from the tea leaves. Examples of such an aroma component include, but are not limited to, pentanal (valeraldehyde), 2-methylpropanal (isobutyraldehyde), trimethylpyrazine, 1-octen-3-ol, 2-ethyl-3,5-dimethylpyrazine, 2-ethyl-3,6-dimethylpyrazine, 2,4-heptadien-6-one, 2,3-diethyl-5-methylpyrazine, 2-methyl-3-n-propylpyrazine, benzaldehyde, ethyl decanoate, acetylthiazoline, ethylacetophenone, and p-cresol.

1-4. Tea Leaf Extract

The solid composition of the present invention contains a tea leaf extract. The term "tea leaf extract" as used herein refers to a component extracted from tea leaves. For the tea leaves in the present invention, leaves obtained from a plant of the genus *Camellia* of the family Theaceae (such as *Camellia sinensis* (L) O. Kuntze) can be used. The tea leaves used in the present invention can be classified into unfermented tea, semi-fermented tea and fermented tea according to the processing method. Examples of the unfermented tea include green tea such as aracha, sencha, gyokuro, kabusecha, tencha, bancha, houjicha, kamairicha, kukicha, boucha, and mecha. Examples of the semi-fermented tea include oolong tea such as tekkannon, shikisyu, ogonkei, and buigancha. Examples of the fermented tea include black tea such as Darjeeling, Assam, and Sri Lanka. In the present invention, only one kind of tea leaves may be used alone, or a plurality of kinds of tea leaves may be blended and used. Furthermore, the tea leaves are not particularly limited as long as they are parts from which an aroma component can be extracted, and leaves, stems, and the like can be used as appropriate, and the form thereof is not limited to large leaves, powder, or the like. In the present invention, a tea leaf extract of green tea is preferably used and a tea leaf extract of sencha is more preferably used, although not particularly limited thereto.

A content of the tea leaf extract in the solid composition of the present invention is not particularly limited, and is, for example, 30 to 90 wt %, preferably 35 to 80 wt %, and more preferably 40 to 70 wt %.

1-5. Other Additives

In addition to the various components described above, it is possible to add additives commonly used in food or drink to the solid composition of the present invention, such as antioxidants, preservatives, pH adjusters, sweeteners, nutritional fortifiers, thickening stabilizers, emulsifiers, dietary fibers, and quality stabilizers, as long as the effect of the present invention is not impaired.

1-6. Applications of Solid Composition

The solid composition of the present invention can be contained in food or drink (beverage or food). That is, according to the present invention, food or drink containing the above-described solid composition can be provided. The solid composition of the present invention is preferably contained in a liquid to prepare a beverage, and is most preferably dissolved in water or hot water to prepare a tea beverage. In this regard, the solid composition of the present invention can be provided as instant tea. The term "instant tea" as used herein refers to a product obtained by drying a solution using an extract of tea leaves as a raw material and processing the dried solution into a solid form. Examples of the tea beverage include unfermented teas (such as green tea), semi-fermented teas (such as oolong tea), and fermented tea (such as black teas), to be more specific, steamed unfermented teas (green tea) such as sencha, bancha, houjicha, gyokuro, kabusecha, and tencha; unfermented teas such as pan-fried tea, such as ureshinocha, aoyagicha, and various Chinese teas; semi-fermented teas such as baozhong tea, tekkannon tea, and oolong tea; and fermented teas such as black tea, awa-bancha, and pu-erh tea. The tea beverage in which the solid composition of the present invention is utilized is preferably green tea. That is, the solid composition of the present invention can be provided as instant green tea.

When the solid composition of the present invention is contained in a liquid such as water or hot water, a content of the solid composition in the liquid is not particularly limited, and is, for example, 0.01 to 20 wt %, preferably 0.05 to 10 wt %, and more preferably 0.1 to 5.0 wt %. Furthermore, the content of the solid composition in the liquid may be adjusted so that the content of linalool in the liquid is, for example, 1 to 1,000 ppb (why), preferably 3 to 500 ppb (w/w), more preferably 5 to 300 ppb to (w/w), even more preferably 10 to 200 ppb (w/w). Furthermore, the content of the solid composition in the liquid may be adjusted so that the content of geraniol in the liquid is 1 to 800 ppb (w/w), preferably 3 to 400 ppb (w/w), more preferably 5 to 200 ppb (w/w), even more preferably 10 to 100 ppb (w/w).

The solid composition of the present invention can also be added to food. Examples of such food include cakes, castella, candies, cookies, jellies, puddings, chocolates, etc. as confectionery, ice cream, ice candy, sherbet, etc. as frozen desserts, and snacks, regardless of whether they are Japanese sweets or Western sweets; and the solid composition can also be used for breads or dairy products. When the solid composition of the present invention is added to food, the amount added can be appropriately set according to the type of the food or the like.

When the solid composition of the present invention is added to food, the amount added can be appropriately set according to the type of the food or the like. The solid composition of the present invention can be added to the food so that the content of the solid composition in the food is 0.01 to 20 wt %, preferably 0.05 to 10 wt %, more preferably 0.1 to 5.0 wt %, even more preferably 0.5 to 5.0 wt %.

Furthermore, the amount of the solid composition of the present invention added to food may be set using the content of linalool as an index. For example, the solid composition of the present invention can be added to food so that the content of linalool in the food is 1 to 1,000 ppb (w/w), preferably 3 to 500 ppb (w/w), more preferably 5 to 300 ppb (w/w), even more preferably 10 to 200 ppb (w/w). Furthermore, the amount of the solid composition of the present invention added to food may be set using the content of geraniol as an index. For example, the solid composition of the present invention can be added to food so that the content of geraniol in the food is 1 to 800 ppb (w/w), preferably 3 to 400 ppb (w/w), more preferably 5 to 200 ppb (w/w), even more preferably 10 to 100 ppb (w/w).

Furthermore, in one embodiment, the present invention is a food or drink (beverage and food) containing geraniol, and dextrin, wherein the food or drink contains dextrin having a molecular weight of 50,000 or more. A content of linalool in the food or drink is preferably 6.0 ppb (w/w) or more per 1.0% solid content (Brix), more preferably 6.05 to 485,000 ppb (w/w), 6.10 to 388,000 ppb (w/w), 6.15 to 291,600 ppb (w/w), 620 to 194,400 ppb (way) per 1.0% solid content (Brix), even more preferably 3.72 to 97,000 ppb (w/w) per 1.0% solid content (Brix). Furthermore, a content of geraniol in the food or drink is preferably 18.0 ppb (w/w) or more per 1.0% solid content (Brix), more preferably 18.0 to 962,000 ppb (w/w), 18.3 to 481,000 ppb 18.5 to 192,500 ppb (w/w), 18.7 to 96,400 ppb (w/w) per 1.0% solid content (Brix), even more preferably 18.8 to 48,200 ppb (w/w) per 1.0% solid content (Brix). Note that the solid content (Brix) value is a value obtained by converting a refractive index measured at 20° C. using a glucometer, a refractometer, or the like into a mass/mass percent of a sucrose solution based on the conversion table provided by the International Commission for Uniform Methods of Sugar Analysis (ICUMSA), and represents a soluble solid content in a composition. Although the type of the food or drink (beverage and food) is not particularly limited, examples of the beverage include steamed unfermented teas (green tea) such as sencha, bancha, houjicha gyokuro, kabusecha, and tencha; unfermented teas such as pan-fried tea such as ureshinocha, aoyagicha, and various Chinese teas; semi-fermented teas such as baozhong tea, tekkannon tea, and oolong tea; and fermented teas such as black tea, awa-bancha, and pu-erh tea. Furthermore, examples of the food include confectionery such as cakes, castella candies, cookies, jellies, puddings, chocolates, etc., frozen desserts such as ice cream, ice candy, sherbet, etc., snacks, breads and dairy products.

2. Producing Method

The solid composition of the present invention can be produced through a step of preparing a solution containing linalool, geraniol, and dextrin described above and a step of drying the obtained solution. The solution may contain the tea leaf extract and various components as described above in addition to linalool, geraniol, and dextrin. The amount of any afire components incorporated can be appropriately set as long as the effect of the present invention is not impaired, and the order of incorporating the various components is not particularly limited. Furthermore, as a solvent of the solution, water may be used, or the extract of tea leaves may be used as it is. Note that the amount of dextrin incorporated into the solution before solidification can be appropriately adjusted so that the content of dextrin in the soluble solid of the solution will be the content in the solid composition described above.

The solution can be dried by a method conventionally known to those skilled in the art. Examples of such a method include spray drying, freeze drying, hot air drying, and vacuum drying, and it is preferable to use spray drying in the present invention. Note that conditions such as temperature and time in the spray drying are not particularly limited, and can be appropriately adjusted for solidifying of the solution.

In producing the solid composition of the present invention, in addition to the steps described above, a step of concentrating the solution containing linalool, geraniol, and dextrin, a step of sterilizing the solution, or the like can be included. Any of the steps can be carried out using a method conventionally known to those skilled in the art.

Furthermore, for linalool or geraniol, the tea leaf extract containing, linalool and/or geraniol (the second tea leaf extract) may be used as described above. By mixing the first tea leaf extract (the tea, leaf extract described in the section of "1-4. Tea Leaf Extract" above) and the second tea leaf extract, a solution containing linalool, geraniol, and dextrin can be prepared. Although not particularly limited, the tea leaf extract containing linalool and/or geraniol (the second tea leaf extract) can be produced through a step of distilling the tea leaves. The tea leaves used as a raw material in the second tea leaf extract are as described above, and tea leaves that have been covered and cultivated with sunlight shielded before plucking, such as kabusecha, gyokuro, or tencha can be preferably used as a raw material in the present invention.

As a method for distilling tea leaves to obtain the tea leaf extract containing linalool and/or geraniol (the second tea leaf extract), a steam distillation method is typically used. The steam distillation method is a method in which steam is passed through a raw material (tea leaves) and an aroma component distilled out along with the steam is cooled and condensed. As the steam distillation method, schemes such as atmospheric pressure steam distillation, reduced pressure steam distillation, and gas-liquid multistage countercurrent contact distillation (spinning cone column) may be adopted, and in the present invention, the atmospheric pressure steam distillation scheme is preferably used. Furthermore, in the steam distillation of tea leaves, a blow-in steam distillation is typically performed. The blow-in steam distillation is a method in which steam is contacted with a raw material directly (tea leaves) placed in a container such as a basket, and the steam obtained through the raw material is recovered and cooled to obtain a distillate.

Regarding the tea leaf extract containing linalool and/or geraniol (the second tea leaf extract), the concentration of various aroma components can be increased through a step of further concentrating the extract obtained by the steam distillation method. As such a concentrating method, distillation concentration is typically performed. In the distillation concentration, for example, a scheme in which a tea leaf extract is introduced into a distillation pot, and heated from the bottom to boil the tea leaf extract, and aroma components together with steam are recovered may be adopted. In the distillation concentration method, both the atmospheric pressure distillation concentration and the reduced pressure distillation concentration may be adopted, and in the present invention, the scheme of the reduced pressure distillation concentration is preferably adopted. Furthermore, when distillation concentration is performed, an operation called salt precipitation may be performed. By performing the salt precipitation treatment, the polarity of the salt draws water molecules in the distillate introduced into the distillation pot, and the volatilization of the organic compound can be promoted. The salt precipitation treatment can be performed by making the distillate targeted for concentration contain a salt such as sodium chloride.

Furthermore, the tea leaf extract containing linalool and/or geraniol (the second, tea leaf extract) may be produced through a process of performing an activated carbon treatment. By performing the activated carbon treatment, the amount of unnecessary aroma components can be reduced, Here, the term "activated carbon" as used herein refers to a porous material having carbon as the main ingredient that is produced from a carbon material such as wood through an activation reaction at high temperature.

3. Method for Enhancing Floral Scent in Food or Drink

The solid composition of the present invention obtained as describes above may be added to food or drink to increase the floral scent in the food or drink. Therefore in another embodiment, the present invention is also a method for increasing the floral scent in food or drink, including a step of adding the solid composition obtained through the above procedure to the food or drink.

EXAMPLES

Hereinafter, the present invention will be described based on examples, but the present invention is not limited to these examples.

Example 1. Test Using Solid Composition Containing Linalool, Geraniol, and 2-Methylbutanal (1) Preparation of Solid Composition
(i) Preparation of Solid Composition Stock Solution A solid composition was prepared using tea leaves extract solid raw material (product name: GT204S, raw material: green tea (made in China)), linear dextrin A (Matsutani Chemical Industry Co., Ltd., TK-16, weight average molecular weight: 910, DE: 18), linear dextrin B (Sanwa Starch Co., Ltd., Sandec #30, weight average molecular weight: 120,000, DE: 2 to 5), and cyclic dextrin (CycloChem Co., Ltd., α-cyclodextrin, weight average molecular weight: 973). Specifically, each raw material was incorporated in proportions shown in Table 1 below to prepare a solid mixture of 6,000 g in total and 14,000 g of water was added thereto to prepare 20,000 g in total (Brix 30%) of a solid composition stock solution. Note that the above described tea leaves extract solid raw material was obtained by di dug and solidifying an extract of tea leaves, and did not contain dextrin.

TABLE 1

|  | Tea Solid Law Material [wt %] | Linear Dextrin A [wt %] | Linear Dextrin B [wt %] | Cyclic Dextrin [wt %] |
| --- | --- | --- | --- | --- |
| Sample 1 | 50 | 31 | 14 | 5 |
| Sample 2 | 50 | 17 | 28 | 5 |
| Sample 3 | 50 | 0 | 45 | 5 |
| Sample 4 | 50 | 45 | 0 | 5 |

(ii) Preparation of Solid Composition

To 20 L of the solid composition stock solution obtained in (i) above, 60 μL of linalool (linalool (product name); manufactured by NACALAI TESQUE, INC.; purity≥97%), 60 μL geraniol (geraniol (product name); manufactured by NACLAI TESQUE, INC.; purity 95%), and 60 μL of 2-methylbutanal (2-Methylbutaldehyde (product name); Tokyo Chemical Industry Co., Ltd.; purity>95%) were added and mixed to prepare a pre-drying stock solution for preparing a solid composition, a portion of the pre-drying stock solution was taken out as a sample for measuring an aromatic component concentration, and then the pre-drying stock solution was subjected to spray drying treatment using a spray dryer to prepare a solid composition. Note that the drying conditions were such that the inlet hot air temperature was 160° C. and the outlet hot air temperature was 110° C.

(2) Measurement of Molecular Weight Distribution in Solid Composition

For the above described solid compositions (Samples 1 to 4), the molecular weight distribution of soluble molecules contained in each composition was measured. Each solid composition was diluted with 0.1 mol/L sodium nitrate solution to a concentration of 1% (w/v) to prepare a sample for analysis, and the molecular weight distribution was measured using gel permeation chromatography (GPC). Note that the conditions of the gel permeation chromatography analysis were as follows.

Apparatus: Sampling Injector: 231 XL (GILSON)

Pump: 305 (GILSON)

Column oven: CTO-10AS VP (Shimadzu Corporation)

Detector: RID-10A (Shimadzu Corporation)

Columns: connected in series in the following order

[Pump]→TSKgel Guard Column PWxl (6.0 min I.D.×4 cm) (TOSOH CORPORATION)→TSKgel G4000-PWxl (particle size 10 μm, 7.8 mm I.D.×30 cm) (TOSOH CORPORATION)→TSKgel G3000PWxl (particle size 7 μm, 7.8 mm×I.D.×30 cm) (TOSOH CORPORATION)→[Detector]

Analytical Data System: LabSolutions (Shimadzu Corporation)

Flow rate: 1 mL/min

Injection volume: 50 μL

Mobile phases: 0.1 mol sodium nitrate solution

Column temperature: 50° C.

Using STANDARD P-82 (Shodex, Showa Denko K.K.) as a standard solution, retention times of eight kinds of molecular weights were first detected and a calibration curve was prepared based on the detection results. Then, from the total value of the peak areas detected at each retention time in the sample for analysis, the proportion of the peak area (proportion to the total peak area) was calculated for each size of the molecules contained in the sample. The results of the molecular weight distribution of Samples 1 to 4 are Shown in Table 2.

TABLE 2

| | Molecular Weight Distribution (%) | | | | | | | | |
|---|---|---|---|---|---|---|---|---|---|
| | less than 200 | 200 or more and less than 500 | 500 or more and less than 1,000 | 1,000 or more and less than 3,000 | 3,000 or more and less than 10,000 | 10,000 or more and less than 30,000 | 30,000 or more and less than 50,000 | 50,000 or more and less than 100,000 | 100,000 or more and less than 150,000 |
| Sample 1 | 4.84 | 9.95 | 23.62 | 35.19 | 12.82 | 5.02 | 1.73 | 2.72 | 1.56 |
| Sample 2 | 0.00 | 4.71 | 28.87 | 28.50 | 11.51 | 5.41 | 7.02 | 4.48 | 3.81 |
| Sample 3 | 3.88 | 9.04 | 17.89 | 20.95 | 9.87 | 11.24 | 5.93 | 7.84 | 4.68 |
| Sample 4 | 0.00 | 6.70 | 35.26 | 42.04 | 13.96 | 2.02 | 0.02 | 0.00 | 0.00 |

| | Molecular Weight Distribution (%) | | | | | | | |
|---|---|---|---|---|---|---|---|---|
| | 150,000 or more and less than 200,000 | 200,000 or more and less than 250,000 | 250,000 or more and less than 300,000 | 300,000 or more and less than 350,000 | 350,000 or more and less than 400,000 | 400,000 or more and less than 450,000 | 450,000 or more and less than 500,000 | more than 500,000 |
| Sample 1 | 1.04 | 0.66 | 0.38 | 0.22 | 0.12 | 0.07 | 0.04 | 0.04 |
| Sample 2 | 2.17 | 1.36 | 0.80 | 0.49 | 0.30 | 0.20 | 0.12 | 0.25 |
| Sample 3 | 3.24 | 2.06 | 1.22 | 0.75 | 0.45 | 0.30 | 0.20 | 0.45 |
| Sample 4 | 0.00 | 0.00 | 0.00 | 0.00 | 0.00 | 0.00 | 0.00 | 0.00 |

Furthermore, Table 3 shows the result of calculating the proportion of dextrin having a molecular weight of 50,000 or more, the proportion of dextrin having a molecular weight of 100,000 or more, the proportion of dextrin having a molecular weight of 150,000 or more, the proportion of dextrin having a molecular weight of 200,000 or more, the proportion of dextrin having a molecular weight of 250,000 or more, the proportion of dextrin hazing a molecular weight of 300,000 or more, the proportion of dextrin having a molecular weight 350,000 or more, the proportion of dextrin having a molecular weight of 400,000 or more, the proportion of dextrin having a molecular weight of 450,000 or more, and the proportion of dextrin having a molecular weight of 500,000 or more in the molecular weight distribution shown in Table 2. Furthermore, Table 3 also shows the proportion of dextrin having a molecular weight of 50,000 or more and less than 200,000 and the proportion of dextrin having a molecular weight of 200,000 or more and less than 350,000 in the molecular weight distribution of Table 2.

that since Sample 4 not containing linear dextrin B, which is high-molecular-weight dextrin, had no peak observed in the region of a, molecular weight of 50,000 or more (see Tables 2 and 3), the peak detected in the region of a molecular weight of 50,000 or more in this test is considered to be due to high-molecular-weight dextrin.

(3) Evaluation of Aroma Component Retention

Each of the pre-drying stock solution and the solid composition obtained as described above was diluted or dissolved with water so as to have a Brix value of 4%. 10 mL of the resultant solution was placed in a vial containing 3 g of sodium chloride, and the vial was sealed and introduced into a gas chromatography analyzer (Flash GC Nose HERACLES II, Alpha M.O.S. Japan K.K.). Linalool, geraniol and 2-methylbutanal in each solution were analyzed under the conditions indicated below.

Incubation 60° C., 15 min

Syringe: temperature: 70° C., post-injection washing: 90 seconds

Headspace injection: 5000 μl at 2.50 μl/sec

TABLE 3

| | Molecular Weight Distribution (%) | | | | | | | | | |
|---|---|---|---|---|---|---|---|---|---|---|
| | 50,000 or more | 100,000 or more | 150,000 or more | 200,000 or more | 250,000 or more | 300,000 or more | 350,000 or more | 400,000 or more | 450,000 or more | 500,000 or more |
| Sample 1 | 6.84 | 4.13 | 2.57 | 1.53 | 0.86 | 0.48 | 0.26 | 0.14 | 0.07 | 0.04 |
| Sample 2 | 13.98 | 9.50 | 3.69 | 3.52 | 2.16 | 1.36 | 0.87 | 0.57 | 0.37 | 0.25 |
| Sample 3 | 21.19 | 13.36 | 8.68 | 5.44 | 3.38 | 2.15 | 1.40 | 0.95 | 0.65 | 0.45 |
| Sample 4 | 0.00 | 0.00 | 0.00 | 0.00 | 0.00 | 0.00 | 0.00 | 0.00 | 0.00 | 0.00 |

| | Molecular Weight Distribution (%) | |
|---|---|---|
| | 50,000–200,000 | 200,000–350,000 |
| Sample 1 | 5.32 | 1.27 |
| Sample 2 | 10.45 | 2.65 |
| Sample 3 | 15.76 | 4.04 |
| Sample 4 | 0.00 | 0.00 |

As shown in Tables 2 and 3 above, it was shown that a peak of dextrin having a molecular weight of 50,000 or more was confirmed in Samples 1 to 3, each of which contains linear dextrin B that is high-molecular-weight dextrin. Note Column 1: MXT-5 (low polarity 10 m, 180 μm ID, 0.4 μm)

Column 2: MXT-WAX (high polarity 10 m, 180 μm, 0.4 μm)

Carrier-gas flow rate: hydrogen 1.6 mL/min
Flame ionization defector (FID) temperature: 260° C.
Injector temperature: 200° C.
Oven temperature: 40° C. (5 seconds) to 1.5° C./second to 250° C. (90 seconds)
Injection time: 125 seconds
Trapping temperature: adsorption 50° C., desorption 240° C.
Trapping time: adsorption 130 seconds, preheating 35 seconds The retention rates of linalool, geraniol, and 2-methylbutanal before and after spray drying were calculated from the integrated values of all peak areas from the data obtained through the analysis. Furthermore, the contents of linalool, geraniol, and 2-methylbutanal in the solid composition after drying were also determined.

TABLE 4

| | Retention Rate of Each Aroma Component | | | Content in Solid Composition (μg/g) | | |
|---|---|---|---|---|---|---|
| | Linalool | Geraniol | 2-Methylbutanal | Linalool | Geraniol | 2-Methylbutanal |
| Sample 1 | 65% | 72% | 46% | 4.359 | 3.231 | 3.500 |
| Sample 2 | 71% | 77% | 55% | 4.333 | 3.209 | 3.826 |
| Sample 3 | 79% | 85% | 75% | 4.684 | 3.497 | 4.937 |

As shown in Tables 1 to 3 above, in Samples 1 to 3, the proportion of dextrin having a molecular weight of 50,000 or more increased in the order of Sample 1, Sample 2, and Sample 3. In addition, as shown in Table 4, the aroma component retention rate increased in the order of Sample 1, Sample 2, and Sample 3, and it was shown that the retention rate of linalool and geraniol in the solid composition increases as the amount of dextrin having a molecular weight of 50,000 or more incorporated increases. From this result, it was shown that the retention rate of linalool and geraniol in the solid composition improved as the dextrin having a molecular weight of 50,000 or more increased. Furthermore, a similar result was observed for 2-methylbutanal, which is an aroma component.

2. Test Using Solid Composition Containing Low Concentrations of Linalool and Geraniol (1) Preparation of Solid Composition A solid composition stock solution was prepared in the same manner as in (1), (i) of Example 1 above. The composition of the solid composition stock solution is shown in Table 5. Then, to 20 L of the solid composition stock solution having the composition shown in Table 5 below. 8.4 μL of linalool (linalool (product name); manufactured by NACALAI TESQUE, INC.; purity ≥97%) and 15.9 μL of geraniol (geraniol (product name); manufactured by NACALAI TESQUE, INC.; purity ≥95%) were added and mixed. A portion of the pre-drying stock solution for preparing the solid composition prepared as described above was taken out as a sample for measuring the aroma component concentration, and then the pre-drying stock solution was subjected to spray drying treatment using a spray dryer to prepare a solid composition. Note that the drying conditions were such that the inlet hot air temperature was 160° C. and the outlet hot air temperature was 110° C.

TABLE 5

| | Tea Solid Law Material [wt %] | Linear Dextrin A [wt %] | Linear Dextrin B [wt %] | Cyclic Dextrin [wt %] |
|---|---|---|---|---|
| Sample 5 | 50 | 45 | 0 | 5 |
| Sample 6 | 50 | 31 | 14 | 5 |
| Sample 7 | 50 | 17 | 28 | 5 |
| Sample 8 | 50 | 0 | 45 | 5 |

(2) Evaluation of Aroma Component Retention

Each of the pre-drying stock solution anal the solid composition obtained as described above was diluted or dissolved with water so as to have a Brix value of 4%. 10 mL of the resultant solution was placed in a vial containing 3 g of sodium chloride, and the vial was sealed and introduced into a gas chromatography analyzer (Flash GC Nose HERACLES II, Alpha M.O.S, Japan K.K.). Linalool and geraniol in each solution were analyzed under the conditions indicated below. The analysis conditions were the same as in (3) of Example 1 above.

The retention rates of linalool and geraniol before and after spray drying were calculated from the integrated values of all peak areas from the data obtained through the analysis. Furthermore, the contents of linalool and geraniol in the solid composition after drying were also determined.

TABLE 6

| | Retention Rate of Each Aroma Component | | Content in Solid Composition (μg/g) | |
|---|---|---|---|---|
| | Linalool | Geraniol | Linalool | Geraniol |
| Sample 5 | 71.1% | 78.1% | 0.612 | 1.860 |
| Sample 6 | 76.4% | 83.6% | 0.644 | 1.980 |
| Sample 7 | 86.6% | 89.3% | 0.661 | 1.990 |
| Sample 8 | 87.2% | 87.2% | 0.672 | 1.970 |

Since the composition shown in Table 5 is the same as the composition shown in Table 1 of Example 1, results of Tables 2 and 3 above show that Samples 6 to 8 of Samples 5 to 8 contain dextrin having a molecular weight of 50,000 or more. As shown in Table 6, Samples 6 to 8, which contain dextrin having a molecular weight of 50,000 or more, had higher retention rates of linalool and geraniol than Sample 5, which does not contain dextrin having a molecular weight of 50,000 or more. This result suggests that the retention rates of linalool and geraniol in the solid composition improve when the solid composition contains dextrin having a molecular weight of 50,000 or more.

Example 3. Test Using Tea, Leaf Extract Containing Linalool, Geraniol, and 2-Methylbutanal at a High Concentration (1) Preparation of Solid Composition
(i) Preparation of Tea Leaf Extract A solid composition stock solution was prepared in the same manner as in (1), (i) of Example 1 above. The composition of the stock solution is shown in the table below.

TABLE 7

| | Tea Solid Law Material [wt %] | Linear Dextrin A [wt %] | Linear Dextrin B [wt %] | Cyclic Dextrin [wt %] |
|---|---|---|---|---|
| Sample 9 | 50 | 45 | 0 | 5 |
| Sample 10 | 50 | 17 | 28 | 5 |
| Sample 11 | 50 | 0 | 45 | 5 |

(ii) Preparation of Distillate Containing Linalool, Geraniol, and 2-Methylbutanal Separately from (i) above, a tea leaf extract containing linalool, geraniol, and 2-methylbutanal was prepared. Specifically, 15 kg of commercially-available kukicha tea leaves was weighed and mixed with 100 kg of water and held at 50° C. for 2 hours to heat the tea leaves. Then, the treated solution containing the tea leaves was introduced into a steam distillation pot, and steam distillation was pert wined in a boiling manner under the conditions of a steam pressure of 0.25 MPa, a steam flow rate of 20 kg/hr, and a steam temperature of 100° C. (atmospheric pressure). Condensation was performed with the cooling refrigerant temperature set to forward 4° C. and backward 6° C., and at a refrigerant flow rate of 30 L/min to recover a distillate. The recovery time of the distillate was 30 minutes from the start of the distillation, and the amount of the recovered distillate was 8 kg. This operation was performed five times to obtain 40 kg in total of the distillate (a tea aroma composition).

The tea aroma composition described above was subjected to an activated carbon treatment. Specifically, 8 g of powdered activated carbon derived from wood having an average pore size of 3 nm (Osaka Gas Chemical, SHIRASAGI WP-Z) was added to 80 kg of the distillate and stirred by a stirrer for 10 minutes. Then, the activated carbon in the distillate was removed using a filter paper (ADVANTEC, No. 2), Note that the treatment temperature in the activated carbon treatment was set to 6° C.

(iii) Preparation of the Solid Composition

8 L of the distillate obtained in (ii) above was added to and mixed with 12 L of the solid composition stock solution obtained in (i) above. A portion of the pre-drying stock solution for preparing the solid composition prepared as described above was taken out as a sample for measuring the aroma component concentration, and then the pre-drying stock solution was subjected to spray drying treatment using a spray dryer to prepare a solid composition. Note that the drying conditions were such that the inlet hot air temperature was 160° C. and the outlet hot air temperature was 110° C.

(2) Molecular Weight Distribution in Solid Composition

For the solid compositions prepared in (1) above, the molecular weight distribution of soluble molecules contained in the composition was measured. The measurement method is as described in (2) of Example 1. The results are shown in Table 8.

TABLE 8

| | Molecular Weight Distribution (%) | | | | | | | | |
|---|---|---|---|---|---|---|---|---|---|
| | less than 200 | 200 or more and less than 500 | 500 or more and less than 1,000 | 1,000 or more and less than 3,000 | 3,000 or more and less than 10,000 | 10,000 or more and less than 30,000 | 30,000 or more and less than 50,000 | 50,000 or more and less than 100,000 | 100,000 or more and less than 150,000 |
| Sample 9 | 0.27 | 0.00 | 30.71 | 50.53 | 15.33 | 2.80 | 0.07 | 0.00 | 0.00 |
| Sample 10 | 0.30 | 0.00 | 25.42 | 33.70 | 11.56 | 8.91 | 4.52 | 4.76 | 4.43 |
| Sample 11 | 0.23 | 0.00 | 22.47 | 22.85 | 9.34 | 12.49 | 7.02 | 7.23 | 7.77 |

| | Molecular Weight Distribution (%) | | | | | | | |
|---|---|---|---|---|---|---|---|---|
| | 150,000 or more and less than 200,000 | 200,000 or more and less than 250,000 | 250,000 or more and less than 300,000 | 300,000 or more and less than 350,000 | 350,000 or more and less than 400,000 | 400,000 or more and less than 450,000 | 450,000 or more and less than 5000,000 | more than 500,000 |
| Sample 9 | 0.00 | 0.00 | 0.00 | 0.00 | 0.00 | 0.00 | 0.00 | 0.00 |
| Sample 10 | 2.63 | 1.62 | 0.89 | 0.53 | 0.29 | 0.18 | 0.11 | 0.16 |
| Sample 11 | 4.19 | 2.58 | 1.53 | 0.85 | 0.56 | 0.32 | 0.21 | 0.38 |

Furthermore, Table 9 shows the result of calculating the proportion of dextrin having a molecular weight of 50,000 or more, the proportion of dextrin having a molecular weight of 100,000 or more, the proportion of dextrin having a molecular weight of 150,000 or more, the proportion of dextrin having a molecular weight of 200,000 or more, the proportion of dextrin having a molecular weight of 250,000 or more, the proportion of dextrin having a molecular weight of 300,000 or more, the proportion of dextrin having a molecular weight of 350,000 or more, the proportion of dextrin having a molecular weight of 400,000 or more, the proportion of dextrin having a molecular weight of 450,000 or more, the proportion of dextrin having a molecular weight of 500,000 or more in the molecular weight distribution shown in Table 8 above. Furthermore, Table 9 also shows the proportion of dextrin having a molecular weight of 50,000 or more and less than 200,000 and the proportion of dextrin having a molecular weight of 200,000 or more and less than 350,000 in the molecular weight distribution of Table 8 above.

TABLE 9

| | Molecular Weight Distribution (%) | | | | | | | | | |
|---|---|---|---|---|---|---|---|---|---|---|
| | 50,000 or more | 100,000 or more | 150,000 or more | 200,000 or more | 250,000 or more | 300,000 or more | 350,000 or more | 400,000 or more | 450,000 or more | 500,000 or more |
| Sample 9 | 0.00 | 0.00 | 0.00 | 0.00 | 0.00 | 0.00 | 0.00 | 0.00 | 0.00 | 0.00 |
| Sample 10 | 15.59 | 10.83 | 6.40 | 3.78 | 2.16 | 1.27 | 0.74 | 0.45 | 0.28 | 0.16 |
| Sample 11 | 25.61 | 18.38 | 10.61 | 6.42 | 3.84 | 2.31 | 1.46 | 0.91 | 0.59 | 0.38 |

| | Molecular Weight Distribution (%) | |
|---|---|---|
| | 50,000-200,000 | 200,000-350,000 |
| Sample 9 | 0.00 | 0.00 |
| Sample 10 | 11.81 | 3.04 |
| Sample 11 | 19.19 | 4.96 |

(3) Evaluation of Aroma Component Retention

Each of the pre-drying stock solution and the solid composition obtained as described above was diluted or dissolved with water so as to have a Brix value of 4%. 10 mL of the resultant solution was placed in a vial containing 3 g of sodium chloride, and the vial was sealed and introduced into a gas chromatography analyzer (Flash GC Nose HERACLES II, Alpha M.O.S. Japan K.K.). Linalool geraniol, and 2-methylbutanal in each solution were analyzed under the conditions indicated in (3) of Example 1.

The retention rates of linalool, geraniol, and 2-methylbutanal before and after spray drying were calculated from the integrated values of all peak areas from the data obtained through the analysis. Furthermore, the linalool, geraniol, and 2-methylbutanal contents in the solid composition after drying were also determined. The results are shown in Table 10.

TABLE 10

| | Retention Rate of Each Aroma Component | | | Content in Solid Composition (µg/g) | | |
|---|---|---|---|---|---|---|
| | Linalool | Geraniol | 2-Methylbutanal | Linalool | Geraniol | 2-Methylbutanal |
| Sample 9 | 63% | 73% | 54% | 7.480 | 1.725 | 1.750 |
| Sample 10 | 70% | 71% | 68% | 8.768 | 1.873 | 2.462 |
| Sample 11 | 75% | 78% | 68% | 10.047 | 2.093 | 2.769 |

As shown in the above results, Samples 10 and 11, which contain dextrin having a molecular weight of 50,000 or more, exhibited high retention rates of linalool and geraniol. This result suggests that the retention rates of linalool and geraniol in the solid composition improve when the solid composition contains dextrin having a molecular weight of 50,000 or more. Furthermore, a similar result was observed for 2-methylbutanal, which is an aroma component.

(4) Sensory Evaluation 0.58 g of the solid composition of Samples 9 to 11 obtained as described above was dissolved in water and adjusted to amount to 100 g, thereby obtaining samples for sensory evaluation. Note that the Brix value of the sample for sensory evaluation was about 0.6%. Converted values of the linalool and geraniol contents in the samples for sensory evaluation prepared as described above are shown in Table 11.

TABLE 11

| | Content in Solid Composition (µg/g) | | Content in Sample for Sensory Evaluation (ppb (w/w)) (per Brix0.6) | | Content in Sample for Sensory Evaluation (ppb (w/w)) (in terms of Briz1.0) | |
|---|---|---|---|---|---|---|
| | Linalool | Geraniol | Linalool | Geraniol | Linalool | Graniol |
| Sample 9 | 7.48 | 1.725 | 40.392 | 9.315 | 67.319 | 15.525 |
| Sample 10 | 8.768 | 1.873 | 47.347 | 10.112 | 78.912 | 16.854 |
| Sample 11 | 10.047 | 2.093 | 54.254 | 11.305 | 90.423 | 18.841 |

Sensory evaluation was performed on each prepared sample by five panelists who were well trained for flavor evaluation. For the sensory evaluation, the degree of a floral scent felt in the sample was evaluated in the following five grades, and scored in increments of 0.1 points, and filially the average value of the evaluation points was calculated. Note that in the sensory evaluation, the evaluation point of the base sample (Sample 9) above was set to three points, and each sample was evaluated.

1: Almost no floral scent felt.
2: Floral scent felt not so much.
3: Floral scent felt.
4: Floral scent lasting (excellent floral scent).
5: Floral scent lasting longer (very excellent floral scent).

TABLE 12

| | Sensory Evaluation Result | | | | |
|---|---|---|---|---|---|
| | Average | Panelist ① | Panelist ② | Panelist ③ | Panelist ④ |
| Sample 9 | 3.0 | 3.0 | 3.0 | 3.0 | 3.0 |
| Sample 10 | 3.4 | 3.5 | 3.5 | 3.0 | 3.5 |
| Sample 11 | 3.7 | 4.0 | 3.7 | 3.7 | 3.5 |

As described above, it was shown that the sample having higher retention rates of linalool and geraniol had a lasting scent that was excellent as the floral scent. Furthermore, from the above results, it was shown that a beverage containing 3.6 ppb or more of linalool per 0.6% of solid content (Brix) or 6.0 ppb or more of linalool in terms of 1.0% of solid content (Brix), had the floral scent lasting. Furthermore, it was shown that the beverage containing 10.8 ppb or more of geranyle per 0.6% of solid content (Brix) or 18.0 ppb or more of geraniol in terms of 1.0% of solid content (Brix) had the floral scent lasting longer.

The invention claimed is:

1. A solid composition comprising linalool, geraniol, and dextrin,
   wherein a content of linalool in the composition is 0.62 µg or more per gram of the composition (0.62 µg/g), and the composition comprises dextrin having a molecular weight of 50,000 or more.

2. The composition according to claim 1, wherein a content of geraniol in the composition is 1.87 µg or more per gram of the composition (1.87 µg/g).

3. The composition according to claim 1, wherein a proportion of the dextrin having a molecular weight of 50,000 or more in molecular weight distribution of the composition is 5 to 35%.

4. The composition according to claim 1, wherein a proportion of dextrin having a molecular weight of from 50,000 to 200,000 in molecular weight distribution of the composition is 2 to 30%.

5. The composition according to claim 1, wherein a proportion of dextrin having a molecular weight of from 200,000 to 350,000 in molecular weight distribution of the composition is 0.5 to 6%.

6. The composition according to claim 1, wherein a proportion of dextrin having a molecular weight of 250,000 or more in molecular weight distribution of the composition is 0.5 to 8%.

7. The composition according to claim 1, wherein a proportion of dextrin having a molecular weight of 350,000 or more in molecular weight distribution of the composition is 0.15 to 3%.

8. The composition according to claim 1, wherein the composition comprises two or more kinds of dextrin.

9. The composition according to claim 1, wherein the composition comprises linear dextrin and cyclic dextrin.

10. The composition according to claim 1, further comprising one or more aroma components selected from the group consisting of 2-methylbutanal, α-ionone, β-cyclocitral, (z)-3-hexenol, 1-penten-3-ol, nerolidol, hexanal, (E)-linalool oxide, β-myrcene, trans-β-ocimene, L-α-terpineol, methyl salicylate, benzyl alcohol and indole.

11. The composition according to claim 1, wherein the composition is a powder composition.

12. The composition according to claim 1, wherein the composition comprises a tea leaf extract.

13. The composition according to claim 12, wherein the tea leaf extract is a tea leaf extract of sencha.

14. A food or drink comprising the composition according to claim 1.

15. The food or drink according to claim 14, wherein the food or drink is a beverage.

16. The food or drink according to claim 15, wherein the food or drink is a tea beverage.

17. A food or drink comprising linalool, geraniol, and dextrin,
    wherein a content of linalool in the food or drink is 6.0 ppb (v/v) or more per 1.0% solid content (Brix), and the food or drink comprises dextrin having a molecular weight of 50,000 or more.

18. The food or drink according to claim 17, wherein a content of geraniol in the food or drink is 18 ppb (v/v) or more per 1.0% solid content (Brix).

* * * * *